(12) United States Patent
Seo et al.

(10) Patent No.: US 10,317,618 B2
(45) Date of Patent: Jun. 11, 2019

(54) ELECTRONIC DEVICE INCLUDING DISPLAY AND LIGHT GUIDE

(71) Applicant: LG ELECTRONICS INC., Seoul (KR)

(72) Inventors: Junewoo Seo, Seoul (KR); Baul Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/528,375

(22) PCT Filed: Nov. 4, 2015

(86) PCT No.: PCT/KR2015/011805
§ 371 (c)(1),
(2) Date: May 19, 2017

(87) PCT Pub. No.: WO2016/080680
PCT Pub. Date: May 26, 2016

(65) Prior Publication Data
US 2017/0322368 A1    Nov. 9, 2017

(30) Foreign Application Priority Data

Nov. 20, 2014  (KR) .................... 10-2014-0162804

(51) Int. Cl.
*F21V 8/00*   (2006.01)
*G06F 1/16*   (2006.01)

(52) U.S. Cl.
CPC .......... *G02B 6/0095* (2013.01); *G02B 6/002* (2013.01); *G02B 6/0051* (2013.01);
(Continued)

(58) Field of Classification Search
CPC ...................................................... G02B 6/006
See application file for complete search history.

(56) References Cited

U.S. PATENT DOCUMENTS

| 6,416,844 B1 * | 7/2002 | Robson | B44C 1/228 |
| | | | 427/164 |
| 7,771,099 B2 * | 8/2010 | Massaro | H04M 1/22 |
| | | | 362/23.13 |

(Continued)

FOREIGN PATENT DOCUMENTS

KR    2001-0068683 A    7/2001

*Primary Examiner* — Alexander K Garlen
(74) *Attorney, Agent, or Firm* — Birch, Stewart, Kolasch & Birch, LLP

(57) ABSTRACT

An electronic device is disclosed. An electronic device according to the present invention comprises a first body equipped with a display in one side thereof; a coupling opening located in the other side of the first body; a light guide unit located in the coupling opening and transmitting light generated by operation of the display to the other side of the first body; and a second body connected to the first body through a hinge, wherein the light guide unit includes a plate and a convex portion formed on one surface of the plate and corresponding to the shape of the coupling opening. According to the present invention, an electronic device may include a light guide unit capable of transmitting light so as to correspond to the shape of a coupling opening of the body.

11 Claims, 8 Drawing Sheets

(52) U.S. Cl.
CPC .......... *G06F 1/1656* (2013.01); *G06F 1/1681* (2013.01); *G06F 1/1683* (2013.01); *G02B 6/0065* (2013.01)

(56) References Cited

U.S. PATENT DOCUMENTS

| | | | |
|---|---|---|---|
| 2001/0009509 A1* | 7/2001 | An | G02F 1/133308 |
| | | | 362/602 |
| 2002/0043012 A1* | 4/2002 | Shibata | B60Q 1/323 |
| | | | 40/546 |
| 2004/0156998 A1 | 8/2004 | Sung | |
| 2009/0237939 A1* | 9/2009 | Sakamoto | G09F 7/00 |
| | | | 362/257 |
| 2010/0238667 A1 | 9/2010 | Wu et al. | |
| 2011/0090712 A1 | 4/2011 | Bergeron et al. | |
| 2012/0026095 A1* | 2/2012 | Tanaka | G06F 1/1615 |
| | | | 345/168 |
| 2012/0050975 A1* | 3/2012 | Garelli | G06F 1/1615 |
| | | | 361/679.27 |
| 2012/0120570 A1* | 5/2012 | Shin | H04M 1/0283 |
| | | | 361/679.01 |
| 2013/0222736 A1 | 8/2013 | Qi et al. | |
| 2016/0041329 A1* | 2/2016 | Lin | G02B 6/0068 |
| | | | 362/97.1 |
| 2016/0203742 A1* | 7/2016 | Peterson | G09F 13/005 |
| | | | 362/23.12 |

* cited by examiner

FIG. 1
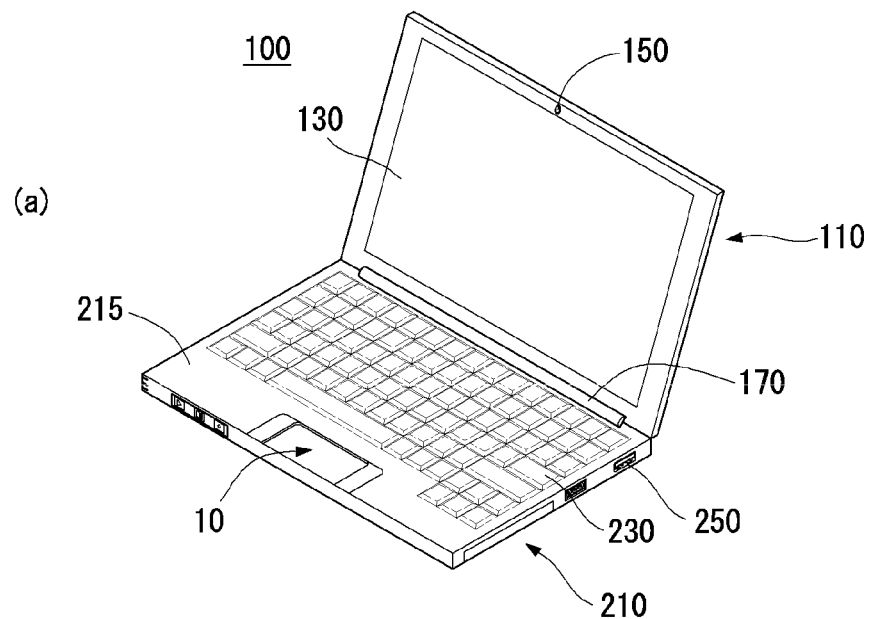
(a)
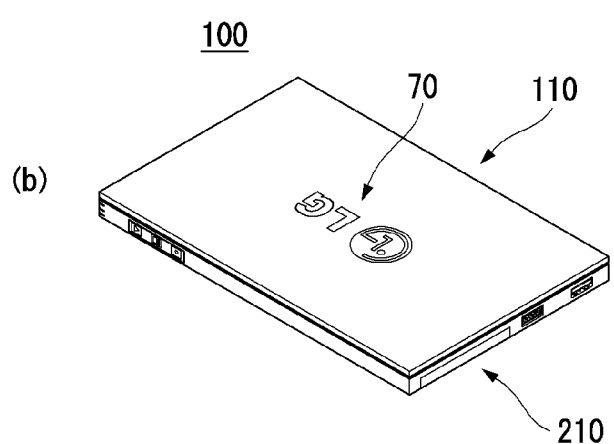
(b)

FIG. 4
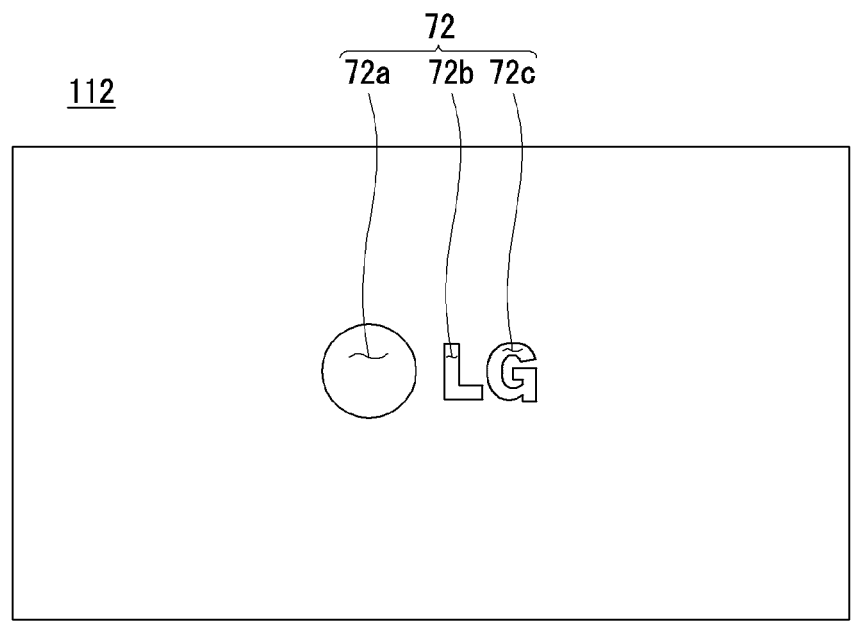
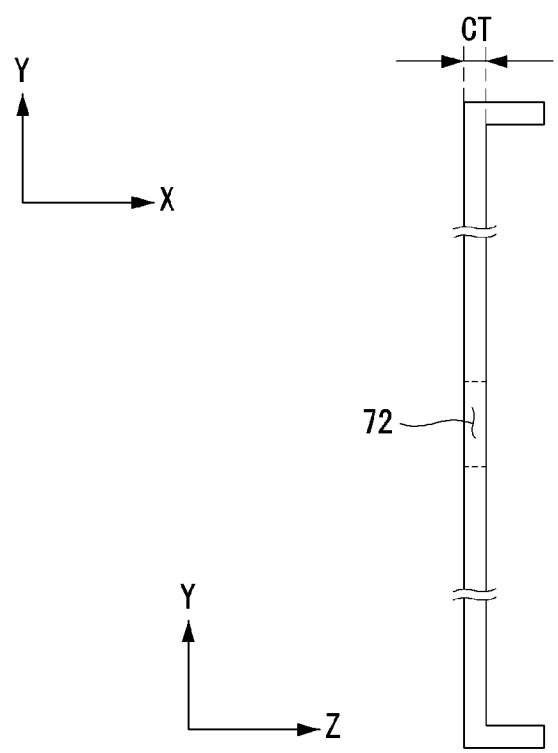

FIG. 8
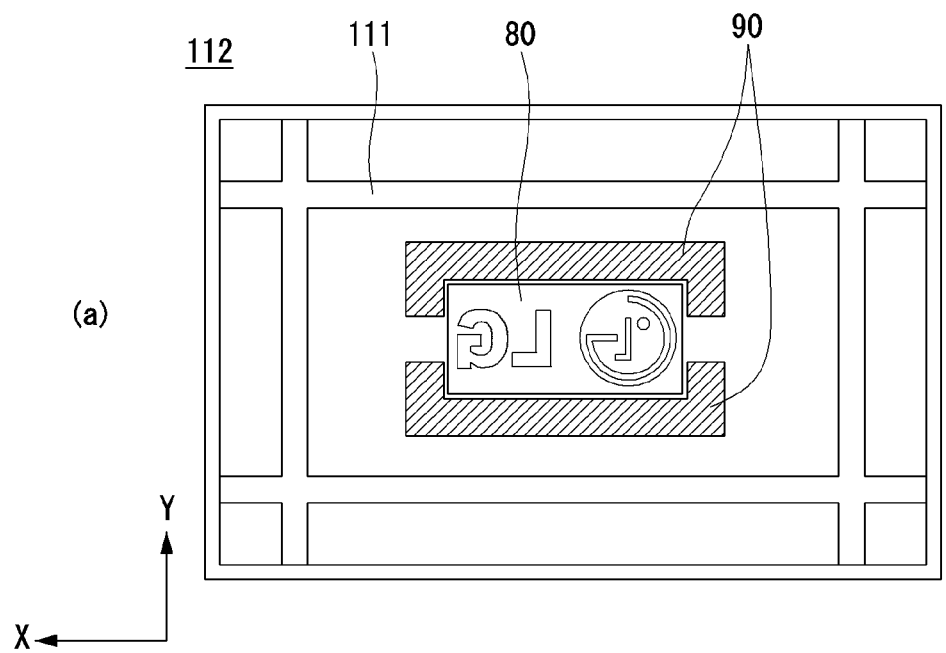
(a)
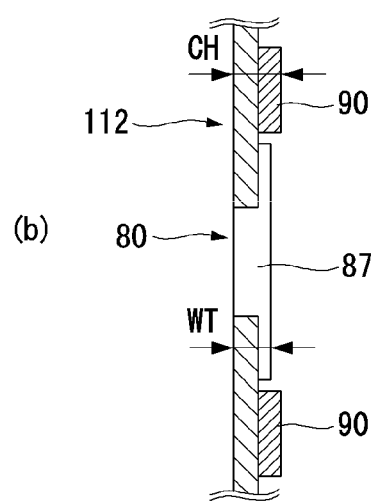
(b)

ELECTRONIC DEVICE INCLUDING DISPLAY AND LIGHT GUIDE

CROSS REFERENCE TO RELATED APPLICATIONS

This application is the National Phase of PCT International Application No. PCT/KR2015/011805, filed on Nov. 4, 2015, which claims priority under 35 U.S.C. 119(a) to Patent Application No. 10-2014-0162804, filed in Republic of Korea on Nov. 20, 2014, all of which are hereby expressly incorporated by reference into the present application.

TECHNICAL FIELD

The present invention relates to an electronic device including a light guide unit capable of transmitting light to correspond to the shape of a coupling opening of a body.

BACKGROUND ART

Electronic devices such as TVs, personal computers, laptop computers, mobile phones, and tap books are evolving into multimedia players providing various functions including image or video capture, playback of music or video files, game, and reception of broadcast programs.

Electronic devices in the form of a laptop computer are being used in various applications since they provide performance higher than a predetermined level while still maintaining portability. Moreover, a mouse function is embedded into the electronic device itself to enhance portability; for example, the mouse function may be embedded into the electronic device in the form of a touchpad.

Recently, to highlight difference in terms of design and/or technology, many attempts are made to add various devices to electronic devices.

DISCLOSURE

Technical Problem

An object of the present invention is to solve the problem described above and other related problems. And another object of the present invention is to provide an electronic device including a light guide unit capable of transmitting light to correspond to the shape of a coupling opening of a body.

Technical Solution

According to one aspect of the present invention to achieve the object described above and other objects, an electronic device comprises a first body equipped with a display in one side thereof; a coupling opening located in the other side of the first body; a light guide unit located in the coupling opening and transmitting light generated by operation of the display to the other side of the first body; and a second body connected to the first body through a hinge, wherein the light guide unit includes a plate and a convex portion formed on one surface of the plate and corresponding to the shape of the coupling opening.

The plate may be formed to have a width corresponding to the area including a plurality of the coupling openings separated from each other, and the convex portion may be formed to correspond to each of the plurality of coupling openings separated from each other.

The light guide unit may further comprise a spray layer applied on at least one area of the plate and the convex portion.

The spray layer may be applied to one surface side of the plate in which the convex portion is formed.

The device may further comprise a taping layer located in the upper side of the spray layer and blocking light from being transmitted to the other side.

The upper surface of the convex portion may be positioned side by side, actually at the same height of the surface of the other side of the first body.

The bottom surface of the plate corresponding to the upper surface of the convex portion may be positioned actually parallel to the other side surface of the first body.

The device may comprise at least one buffer member located in the outer peripheral region of the light guide unit of the light guide unit coupling surface.

The height of the light guide unit may be smaller than the sum of the height of the coupling opening and the height of the buffer member.

The light guide unit may be bonded to the first body.

Advantageous Effects

The following describe the advantageous effects of an electronic device according to the present invention.

According to at least one of the embodiment of the present invention, the electronic device may include a light guide unit capable of transmitting light to correspond to the shape of a coupling opening of a body.

The additional scope of the present invention may be clearly understood from the detailed descriptions given below. However, since various modifications and changes of the present invention may be clearly understood by those skilled in the art within the technical principles and scope of the present invention, it should be understood that detailed descriptions and specific embodiments such as preferred embodiments of the present invention have been provided simply for the purpose of illustration

BRIEF DESCRIPTION OF THE DRAWINGS

FIG. 1 illustrates an electronic device according to one embodiment of the present invention.

FIGS. 4 and 5 illustrates one structure of the electronic device of FIG. 2.

FIG. 8 illustrates a coupling state of the light guide unit of FIG. 2.

MODE FOR INVENTION

Figure 2:
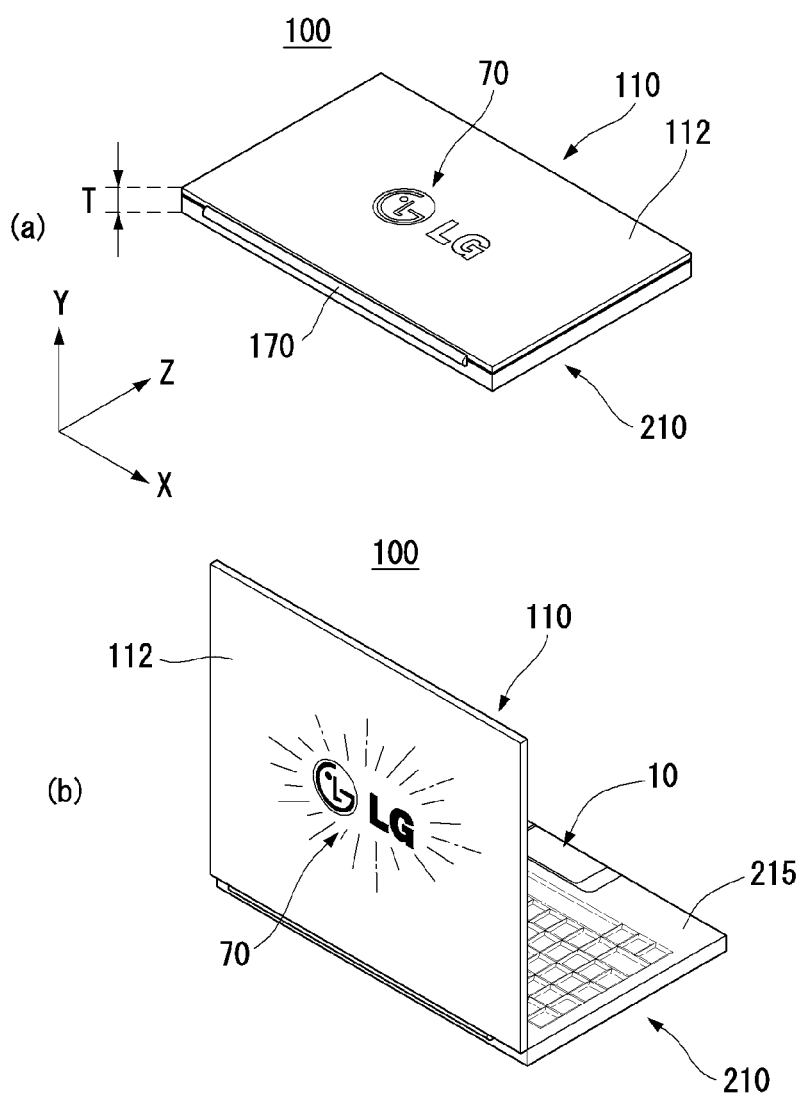
FIGS. 2 and 3 illustrate the electronic device of FIG. 1.

In what follows, preferred embodiments of the present invention will be described in detail with reference to appended drawings. It should be noted that the same reference numbers are assigned to the constituting elements which are the same or similar to each other irrespective of their drawing symbols and repeated descriptions thereof will be omitted. The suffixes "module" and "portion" for the constituting elements appearing in the descriptions below are assigned or used interchangeably simply for the convenience of writing this document and do not have specific meanings or roles distinguished from each other. Also, in case it is determined that specific descriptions for related technologies or methods known to the public obscure the technical principles of the embodiments disclosed in this document, the detailed descriptions thereof will be omitted. Also, it should be understood that appended drawings are intended only to help understanding the embodiments disclosed in the present document and thus do not limit the technical principles disclosed in the present document but include all of the modifications, equivalent implementations, or substitutes of the embodiments belonging to the technical principles and scope of the present invention.

The terms including ordinal numbers such as first and second may be used to describe various constituting elements, but the elements are not limited by those terms including ordinal numbers. Those terms are used only for the purpose of distinguishing one constituting elements from the others.

When a constituting element is referred to as being "connected" to a different constituting element, it should be understood that the constituting elements may be connected directly to the different constituting element, but a third constituting element may be present between the two elements. On the other hand, when a constituting element is referred to as being "directly connected" to another element, it should be understood that no other element is present between the two elements.

A singular expression includes plural expressions unless the context explicitly indicates otherwise.

It should be understood that the terms of "comprise" or "have" used in the present document are introduced merely to indicate existence of characteristics, numbers, steps, operations, constituting elements, components, or a combination thereof specified in the present document but do not preclude the existence of or possibility of adding one or more other characteristics, numbers, steps, operations, constituting elements, components, or a combination thereof.

Electronic devices described in this document may include laptop computers, digital broadcast terminals, PDAs (Personal Digital Assistants), PMPs (Portable Multimedia Players), navigation terminals, slate PCs, tablet PCs, and ultrabooks.

However, it should be easily understood by those skilled in the art that except for the case applicable only for mobile terminals, the structure according to embodiments of the present invention may also be applied to fixed terminals such as digital TVs, desktop computers, and digital signage.

FIG. 1 illustrates an electronic device according to one embodiment of the present invention.

As shown in the figure, an electronic device 100 according to one embodiment of the present invention may belong to either a first state in which a first 110 and a second body 210 are open or a second state in which the first 110 and the second body 210 are closed.

As shown in FIG. 1(a), the electronic device 100 may be in the first state. The first body 110 may be connected to the second body 210 through the hinge 170. The first body 110 may rotate relative to the second body 210 through the hinge 170.

For example, while the second body 210 is fixed to the bottom surface, the first body 110 may rotate so as to be in the first state in which the display 130 of the front surface of the first body 110 is exposed to the outside.

The first body 110 may be equipped with the aforementioned display 130 and a camera 150.

The second body 210 may be equipped with a keyboard 230 obtaining key inputs from the user. The side surface of the second body 210 may be equipped with at least one interface 250 through which an external device may be connected.

The second body 210 may be equipped with a touchpad assembly 10 capable of obtaining a touch input from the user. The touchpad assembly 10 may be located on the upper case 215 of the second body 210. Therefore, when the electronic device 100 is in the first state, the touchpad assembly 10 may be exposed to the outside.

As shown in FIG. 1(b), the electronic device 100 may be in the second state. The second state may be a state in which the first body 110 is in close contact with the second body 210. In the first state, the display 130 of the first body 110, the keyboard 230 of the second body 210, and the touchpad assembly 10 may not be exposed to the outside.

A logo area 70 may be prepared on the outside surface of the first body 110.

A logo of the manufacturer of the electronic device 100 and/or an icon for identifying the user of the electronic device 100 may be displayed on the logo area 70. The logo area 70 may shine brightly while the electronic device 100 is in use. For example, the lighting of the logo area 70 may be activated while the electronic device 100 is in the first state, and the lighting of the logo area 70 may be deactivated while in the second state.

Figure 3:
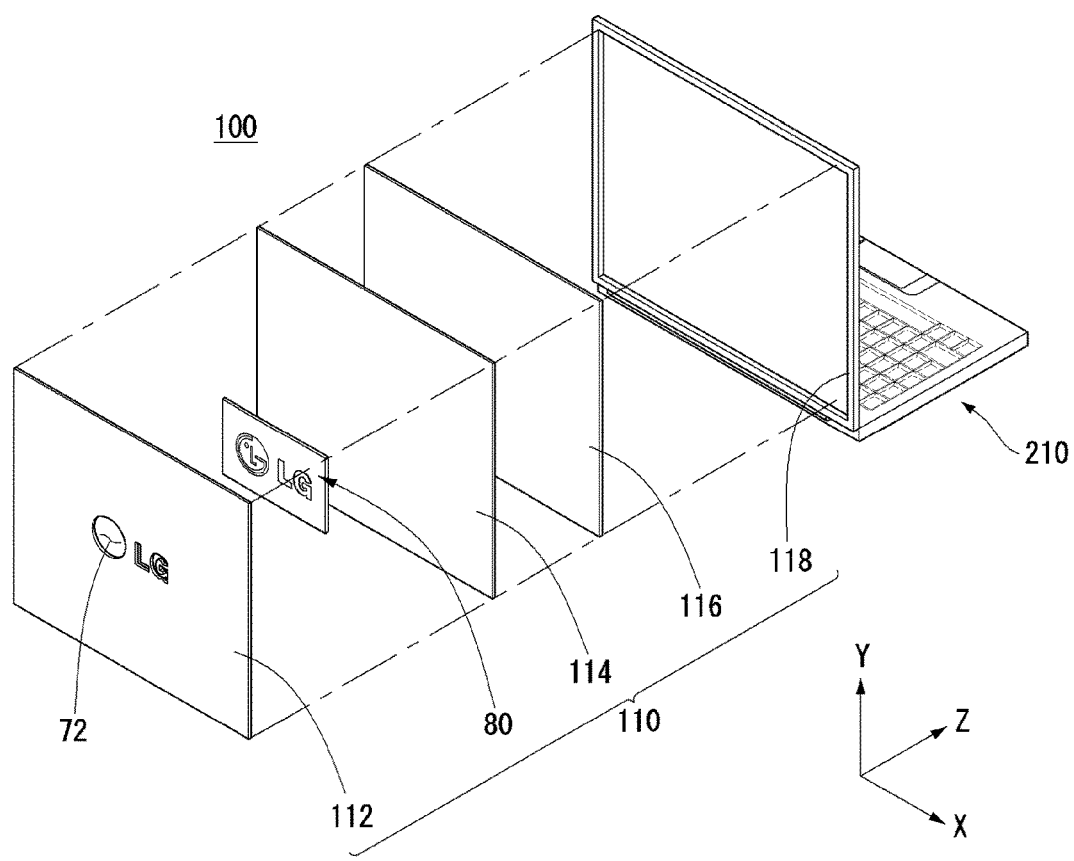

FIGS. 2 and 3 illustrate the electronic device of FIG. 1.

As shown in the figures, an electronic device 100 according to one embodiment of the present invention may illuminate the logo area 70 by using the light guide unit 80.

As shown in FIG. 2(a), the first 110 and the second body 210 of the electronic device 100 may be in the first state in which they are in contact with each other. In the first state, thickness (T) of the electronic device 100 may have a primary effect on the size of the electronic device 100 that the user experiences. Therefore, various technologies are employed to reduce thickness (T) of electronic devices 100.

The logo area 70 may have an effect on the thickness (T) of the electronic device 100. In other words, due to the logo area 70 located on the outer surface of the first body 110 of the electronic device 100, thickness (T) of the electronic device 100 may be increased. The light guide unit 80 of the electronic device 100 according to one embodiment of the present invention may eliminate or minimize the influence on the thickness (T) of the electronic device 100.

As shown in FIG. 2(b), the electronic device 100 may be in the second state in which the first 110 and the second body 210 are open. In the second state, light may be emitted through the logo area 70. In other words, the logo area 70 may be turned off in the first state, while the logo area 70 may be turned on in the second state.

The on-off state of the logo area 70 may be related to the operation of the backlight unit 114 located in the first body 100.

As shown in FIG. 3, the first body 110 may include a cover 112, backlight unit 114, optical sheet 116, and display 118.

The backlight unit 114 may generate light while the electronic device 100 is operating. In other words, the light generated at the backlight unit 114 may illuminate the display 118 through the optical sheet 166.

At least part of the light generated at the backlight unit 114 may be emitted in the opposite direction of the display 118. For example, light may be emitted toward the light guide unit 80. The light emitted toward the light guide unit 80 may be emitted to the outside through the cover 112.

A coupling opening 72 may be formed in the cover 112. The shape of the coupling opening 72 may correspond to at least part of the light guide unit 80. Light corresponding to the shape of the coupling opening 72 and/or light guide unit 80 may be observed from the outside. For example, if the backlight unit 114 is activated according to the operation of the electronic device 100, the display 118 and the light guide unit 80 may be illuminated simultaneously by the light emitted from the backlight unit 114.

Figure 5:
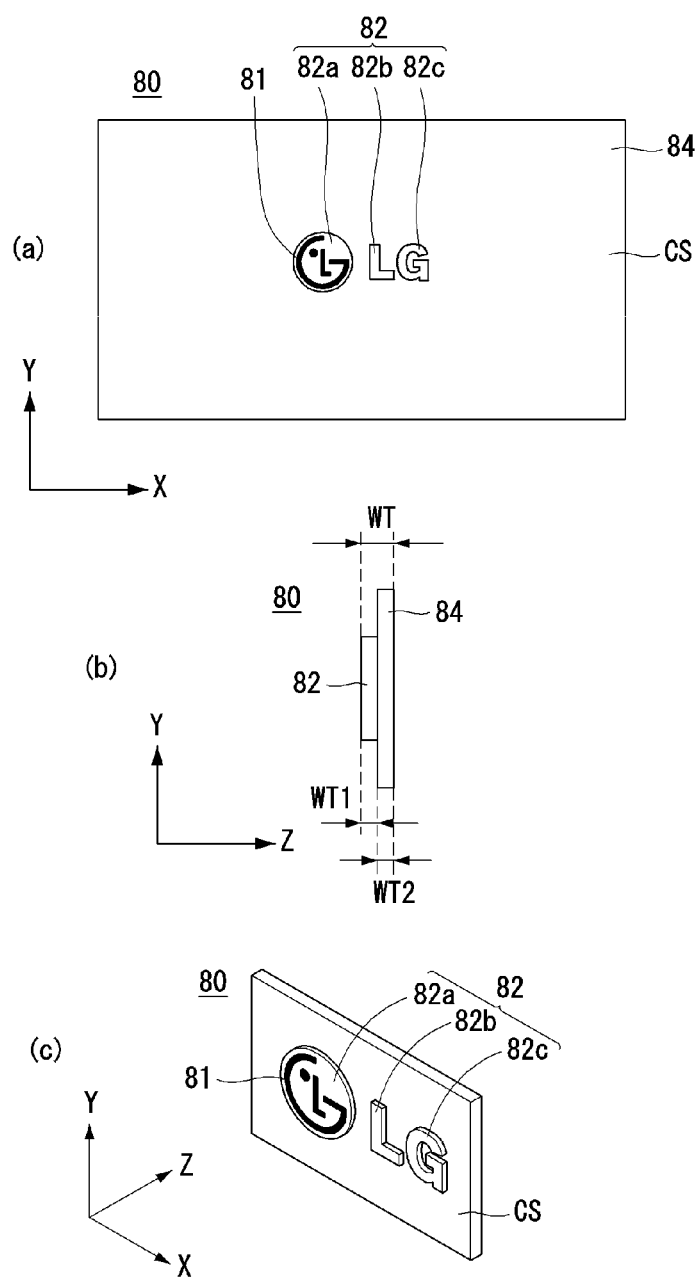

FIGS. 4 and 5 illustrates one structure of the electronic device of FIG. 2.

As shown in the figures, an electronic device 100 may include a backcover 112 and a light guide unit 80 coupled to the backcover 112.

As shown in FIG. 4(*a*), a coupling opening 72 may be formed in the backcover 112.

The coupling opening 72 may be formed in at least one part of the backcover 112. The coupling opening 72 may be in the form of penetrating at least one part of the backcover 112. The coupling opening 72 may correspond to the shape to be displayed on the backcover 122. For example, the coupling opening 72 may correspond to the shape such as numbers, letters, and logo.

The coupling opening 72 may be further divided into a plurality of coupling openings to correspond to a desired shape. For example, the coupling opening 72 may be divided into a first to a third coupling opening (72*a* to 72*c*) separated from each other.

The coupling opening 72 may be used not only for the area to which the light guide unit 80 is coupled but also for a frame representing a shape to be displayed. In other words, a particular shape may be expressed through the first to the third coupling opening (72*a* to 72*c*) penetrated to correspond to the shape. For example, the letter 'L' may be expressed directly from the shape of the second coupling opening 72*b* itself. Since the coupling opening 72 itself may be used to express a specific shape, thickness and/or size of the device due to adding a separate structure to express the shape may be prevented from being increased.

As shown in FIG. 4(*b*), thickness of the coupling opening 72 may be measured to be CT. The thickness (CT) of the coupling opening 72 may be the thickness of the backcover 112. In other words, the backcover itself may have been perforated.

As shown in FIG. 5(*a*), the light guide unit 80 may include a plate 84 and a convex portion 82.

The plate 84 may be a body part of the light guide unit 80. The plate 84 may be in the form of a flat plate. The plate 84 in the form of a flat plate may correspond to the coupling opening area (72 of FIG. 4). For example, size of the plate 84 may correspond to the size of the first to third coupling opening (72*a* to 72*c* of FIG. 4) expressing a specific shape. Since the size of the plate 84 covers the whole area of the coupling opening (72 of FIG. 40), inconvenience of attaching the plate 84 to each of the first to the third coupling opening (72*a* to 72*c* of FIG.4) may be eliminated. At least one part of the plate 84 may further comprise a spray layer (CS).

The spray layer (CS) may be formed on the plate 84 by spraying specific paint thereon. The light generated at the backlight unit (114 of FIG. 3) may be diffused as it goes through the spray layer CS. The light generated at the backlight unit (114 of FIG. 3) may change its color as it goes through the spray layer (CS). For example, color of the light may be changed due to the color of the spray layer (CS). Considering the fact that the light generated at the backlight unit (114 of FIG. 3) has to be emitted along a path guiding the light to the outside through the coupling opening (72 of FIG. 3), the spray layer (CS) may be formed only in the area corresponding to the convex portion 82 or in a partial area including the area corresponding to the convex portion 82.

The spray layer (CS) may be realized with a considerably small thickness compared with conventional diffusion sheets. In other words, since the spray layer (CS) is formed by spraying specific paint on at least one part of the plate 84, the spray layer (CS) may be considered to be superior to conventional diffusion sheets which require an additional structure in view of thickness. The effect described above may be more readily understood by considering that reducing thickness and/or size of electronic devices 100 is a major issue in the corresponding field.

The convex portion 82 may be an area protruding in the upper direction from the plate 84. The convex portion 82 may protrude in the upper direction to have a predetermined height. The convex portion 82 may include a first to a third convex portion (82*a* to 82*c*) corresponding to the first to the third coupling opening (72*a* to 72*c* of FIG. 4).

The first to the third convex portion (82*a* to 82*c*) may correspond to the shape to be realized by the light guide unit 80. For example, the first to the third convex portion (82*a* to 82*c*) may correspond to specific letters or shapes, respectively.

As shown in FIG. 5(*b*), the overall height of the light guide unit 80 may amount to WT. The height of the convex portion 82 may be WT1, and the height of the plate 84 may be WT2. The height of the convex portion 82, WT1, may correspond to the height of the backcover (112 of FIG. 4), CT.

The height WT1 of the convex portion 82 may be the same at a plurality of positions separated from each other. For example, the first to the third convex portions (82*a* to 82*c*) may protrude to have a predetermined height corresponding to the height CT of the backcover (112 of FIG. 4).

As shown in FIG. 5(*c*), the convex portion 82 of the light guide unit 80 may be in the form of protruding toward the front surface of the light guide unit 80.

Figure 6:
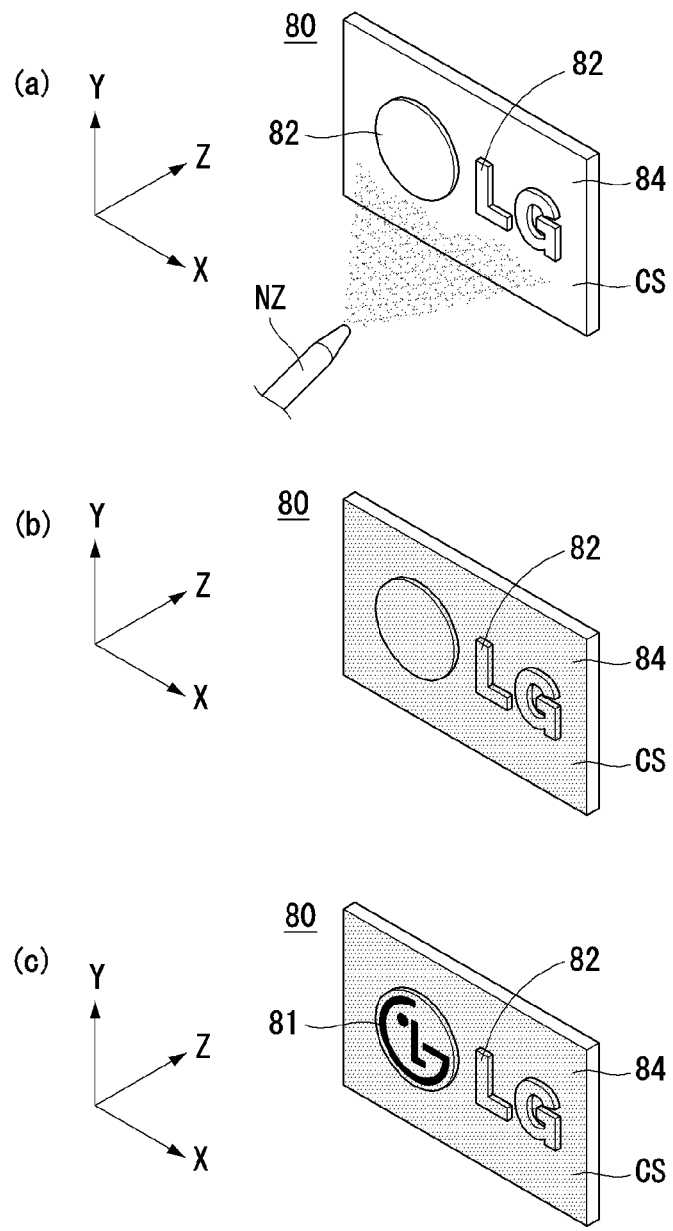
FIG. 6 illustrates a manufacturing process of the light guide unit of FIG. 2.

FIG. 6 illustrates a manufacturing process of the light guide unit of FIG. 2.

As shown in the figure, the light guide unit 80 according to one embodiment of the present invention may be formed through a predetermined manufacturing process.

As shown in FIG. 6(*a*), a convex portion 82 may be formed on the plate 84.

The plate 84 and the convex portion 82 may be formed by injecting a resin material. For example, the plate 84 and the convex portion 82 may be formed through a process of injection molding of transparent and/or translucent plastic material.

Paint may be sprayed from a nozzle (NZ) on at least one part of the plate 84 and the convex portion 82. Paint may be sprayed on the surface on which the convex portion 82 is formed. The paint may comprise micro-scale particles capable of diffusing light and penetrating the convex portion 82. The paint may have a specific color.

As shown in FIG. 6(*b*), the paint sprayed on the plate 84 and the convex portion 82 may serve as a spray layer (CS). As described above, thickness of the spray layer (CS) may be thinner than when a diffusion sheet is additionally used.

As shown in FIG. 6(*c*), a taping layer 81 may be additionally attached. The taping layer 81 may serve to block the light generated at the backlight unit (114 of FIG. 3). For example, the taping layer 81 may be made of a translucent or opaque material. One surface of the taping layer 81 may be coated with an adhesive. The taping layer 81 may be attached to a desired position from design so that light may not be transmitted.

Figure 7:
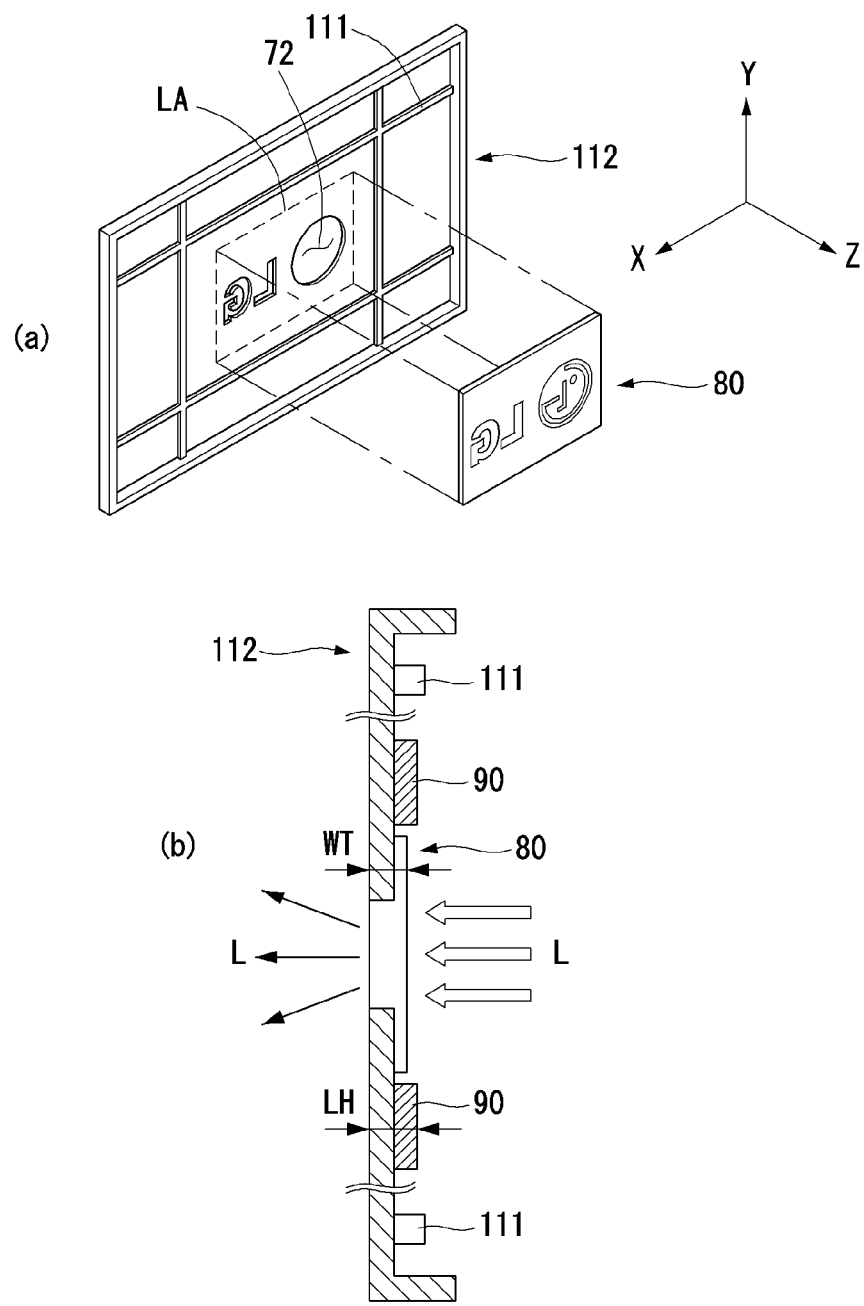
FIG. 7 illustrates the operation of the light guide unit of FIG. 2.

FIG. 7 illustrates the operation of the light guide unit of FIG. 2.

As shown in the figure, the light guide unit 80 according to one embodiment of the present invention may be attached to the inner surface of the backcover 112 and diffuse light to the outside.

As shown in FIG. 7(a), the light guide unit 80 may be coupled to the coupling area (LA) of the inner surface of the backcover 112. The coupling area LA may include a plurality of coupling openings 72 formed in the backcover 112. Around the coupling area LA, at least one rib 111 may be formed to protect the light guide unit 80 and providing rigidity to the backcover 112.

The light guide unit 80 may be bonded to the backcover 112. For example, the light guide unit 80 may be attached to the backcover 122 by applying heat or using an adhesive. Since a separate fastening member such as a screw is not used to couple the light guide unit 80 with the backcover 112, space required for coupling the light guide unit 80 may be minimized.

As shown in FIG. 7(b), light (L) may be diffused to the outside through the light guide unit 80 attached to the backcover 112. The height WT of the light guide unit 80 may be smaller than the height LH of the rib 111 formed on the backcover 112. Therefore, other structure such as the backlight unit (114 of FIG. 3) may be prevented from contacting the light guide unit 80 directly.

FIG. 8 illustrates a coupling state of the light guide unit of FIG. 2.

As shown in FIG. 8(a), the electronic device 10 according to one embodiment of the present invention may include a buffer member 90 installed in the outer peripheral area of the light guide unit 80 attached to the backcover 112. For example, the buffer member 90 may be disposed in such a way to surround the light guide unit 80 at a slightly separated position from the light guide unit 80.

The buffer member 90 may be made of an elastic material. For example, the buffer member 90 may be made of sponge or rubber. The buffer member 90 may prevent a pressure due to an external force from being applied to the light guide unit 80.

As shown in FIG. 8(b), the height CH of the buffer member 90 may be larger than the height WT of the light guide unit 80. Due to the height of the buffer member 90, other structures inside the electronic device 100 may contact the buffer member 90 first rather than the light guide unit 80. Therefore, the light guide unit 80 and/or other structures may be prevented from being damaged, and noise due to contact may be prevented.

The upper surface 96 of the light guide unit 80 may be flat. In other words, the upper surface 96 forms a flat surface like the outer surface of the backcover 112 and may be actually disposed in parallel with the outer surface of the backcover 112 at the same height. Therefore, when observed from the outside, the electronic device 100 may look flat and consistent without showing irregularities.

The bottom surface 87 of the light guide unit 80 may be flat. In other words, the bottom surface 87 may be actually parallel to the upper surface 86 of the buffer member. This kind of arrangement may be different from existing arrangements including a diffusion sheet. In other words, in case a separate diffusion sheet is used to diffuse light, the bottom surface 87 may not be flat because a diffusion sheet having a specific shape such as a semicircle is attached to alter the path of the light. Due to the flat bottom surface 87, the light guide unit 80 may be installed while the thickness of the electronic device 100 is less influenced.

The detailed descriptions given above should not be interpreted in any aspect as limiting but should be considered illustrative. The technical scope of the present invention should be determined by reasonable interpretation of the appended claims, and all of the possible changes within the equivalent scope of the present invention belong to the technical scope of the present invention.

What is claimed is:

1. An electronic device, comprising:
   a first body equipped with a display in one side thereof,
   a coupling opening located in an other side of the first body;
   a light guide covering the coupling opening and transmitting light generated by operation of the display to the other side of the first body;
   at least one buffer member coupled to an inner surface of the other side of the first body and positioned in an outer peripheral region of the light guide;
   a second body connected to the first body through a hinge; and
   a paint layer formed on the light guide and exposed to an outside through the coupling opening, wherein the light guide comprises:
      a plate attached to the inner surface of the other side of the first body; and
      a convex portion formed on one surface of the plate and positioned in the coupling opening.

2. The electronic device of claim 1, wherein the plate is formed to have a width corresponding to the area including a plurality of the coupling openings separated from each other, and the convex portion is formed to correspond to each of the plurality of coupling openings separated from each other.

3. The electronic device of claim 1, wherein the paint layer is applied on at least one area of the plate and the convex portion.

4. The electronic device of claim 3, wherein the paint layer is applied to one surface side of the plate in which the convex portion is formed.

5. The electronic device of claim 3, further comprising a taping layer located in an upper side of the paint layer and blocking light from being transmitted to the other side of the first body.

6. The electronic device of claim 1, wherein an upper surface of the convex portion is positioned side by side at a same height of a surface of the other side of the first body.

7. The electronic device of claim 1, wherein a bottom surface of the plate corresponding to an upper surface of the convex portion is positioned parallel to the other side surface of the first body.

8. The electronic device of claim 1, wherein a height of the light guide is smaller than a sum of a height of the coupling opening and a height of the buffer member.

9. The electronic device of claim 1, wherein the light guide is bonded to the first body.

10. The electronic device of claim 1, wherein the convex portion corresponds to the shape of the coupling opening.

11. The electronic device of claim 1, wherein a height of the buffer member from the inner surface is higher than a height of the plate from the inner surface.

* * * * *